(12) United States Patent
Merry

(10) Patent No.: US 8,186,058 B2
(45) Date of Patent: May 29, 2012

(54) EXHAUST SYSTEM COMPONENT HAVING INSULATED DOUBLE WALL

(75) Inventor: Richard P. Merry, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1528 days.

(21) Appl. No.: 10/551,257

(22) PCT Filed: Mar. 24, 2004

(86) PCT No.: PCT/US2004/008989
§ 371 (c)(1),
(2), (4) Date: Jul. 24, 2006

(87) PCT Pub. No.: WO2004/094794
PCT Pub. Date: Nov. 4, 2004

(65) Prior Publication Data
US 2007/0065349 A1      Mar. 22, 2007

(30) Foreign Application Priority Data
Apr. 2, 2003 (EP) .................................. 03100880

(51) Int. Cl.
*B21D 51/16* (2006.01)
(52) U.S. Cl. ........ 29/890; 29/890.08; 422/179; 422/180
(58) Field of Classification Search .................... 29/890, 29/515, 890.08, 419.1; 422/179, 180, 221; 264/320
See application file for complete search history.

(56) References Cited

U.S. PATENT DOCUMENTS

| | | | |
|---|---|---|---|
| 3,916,057 A | 10/1975 | Hatch et al. | |
| 3,991,254 A | 11/1976 | Takeuchi | |
| 4,181,514 A | 1/1980 | Lefkowitz et al. | |
| 4,305,992 A | 12/1981 | Langer et al. | |
| 5,024,289 A | 6/1991 | Merry | |
| 5,250,269 A | 10/1993 | Langer | |
| 5,290,522 A | 3/1994 | Rogers et al. | |
| 5,419,127 A | 5/1995 | Moore, III | |
| 5,523,059 A | 6/1996 | Langer | |
| 5,697,215 A | 12/1997 | Canevet et al. | |
| 5,766,541 A | 6/1998 | Knutsson et al. | |
| 5,869,010 A * | 2/1999 | Langer | 422/179 |
| 6,231,818 B1 * | 5/2001 | TenEyck | 422/179 |
| 6,436,598 B1 * | 8/2002 | Honma et al. | 430/108.8 |
| 7,758,795 B2 * | 7/2010 | Shirk et al. | 264/320 |

FOREIGN PATENT DOCUMENTS

| | | |
|---|---|---|
| DE | 36 42 714 A1 | 6/1988 |
| DE | 37 20 714 A1 | 1/1989 |
| EP | 1 149 992 A1 | 10/2001 |
| WO | WO 98/50688 A1 | 11/1998 |
| WO | WO 00/33946 | 6/2000 |
| WO | WO 00/75496 | 12/2000 |

\* cited by examiner

*Primary Examiner* — David Bryant
*Assistant Examiner* — Ryan J Walters

(57) ABSTRACT

An exhaust system component (18, 10) for use in an exhaust system of a motor vehicle. The exhaust system component comprises a double wall surrounding a space (9, 11; 21) through which exhaust gas may flow when the exhaust system component is in use in an exhaust system. The double wall is comprised of a first and second metal wall (12, 14; 26, 28) that define between them a gap. The gap comprises an insulation material (16) made of chopped aluminium or magnesium aluminium silicate glass fibers. The insulation material can be in the form of, for example, an end cone perform. The exhaust system component can be an exhaust pipe (18).

17 Claims, 1 Drawing Sheet

EXHAUST SYSTEM COMPONENT HAVING INSULATED DOUBLE WALL

1. FIELD OF THE INVENTION

The present invention relates to an exhaust system component for use in an exhaust system of a motor vehicle, in particular a motor vehicle having an internal combustion engine. The invention relates in particular to an insulation material for use in the gap of a double wall of the exhaust system component. The invention further relates to an exhaust system of a motor vehicle and to an end cone preform of insulation material.

2. BACKGROUND OF THE INVENTION

With the advent of more and more plastic and electronic components on motorized vehicles, particularly automobiles, it is becoming more important to insulate these items from the hot components of the exhaust system. Presently, individual components or specific areas of the car are protected by heat shields or insulation, or are located a sufficient distance from the exhaust system to avoid heat. Heat shields or insulation can be costly when the item to be protected is large, such as a plastic gasoline tank, and it is not always feasible or practical to locate such items away from the exhaust system. A more economical approach is to insulate the source of the heat. In this case: the exhaust system component through which flows exhaust gas and which is heated by the exhaust gas. Exhaust system components include for example exhaust pipes as well as catalytic converters.

Pollution control devices may contain one or more catalysts, which are typically coated onto a substrate in the form of a monolithic structure. The monolithic structures are usually ceramic, although metal monoliths have been used. The catalyst(s) oxidize carbon monoxide and hydrocarbons; reduce the oxides of nitrogen, or a combination thereof in exhaust gases. Diesel particulate filters or traps are typically in the form of wall flow filters having a honeycombed monolithic structure made from porous crystalline ceramic materials. Alternate cells of the honeycombed monolithic structure are plugged so that the exhaust gas enters one cell, flows through the porous wall into another cell, and then exits the structure.

In common constructions of these pollution control devices, the monolithic structure is enclosed within a metal housing. Because the monolithic structure typically has a larger diameter than the exhaust pipe from the vehicle, the metal housing typically includes a transition zone between the inlet and/or outlet of the converter and the monolith. This transition zone, referred to as the end cone region, narrows from a diameter suitable for the monolithic structure to a diameter suitable for connection to an exhaust pipe. The end cone is usually conical in shape and can be provided on both the inlet and outlet side of the pollution control device.

The pollution control device typically must reach a certain temperature, e.g. 250° C. or above before they "light off" or begin to oxidize carbon monoxide and hydrocarbons. They are therefore preferably located close to the engine. Additionally, insulation is typically provided between the pollution control device and the housing of the converter and it is generally also preferred to insulate exhaust system components between the engine and the pollution control device so as to minimizes heat loss and therefore decreases the time for "light off" to occur. This is very important when the car is first started, especially in cold weather, to satisfy the increasingly stringent air quality standards.

Insulation is thus typically placed in the end cone region of the catalytic converter. The end cone region typically has a double-wall construction that includes an outer metal cone and an inner metal cone with a gap defined between the two cones. Insulation material can be placed in the gap between the inner and outer metal housings. The insulation can be in the form of a mat or as a three-dimensional form.

Many different insulation materials have been disclosed for use in exhaust system components. For example, U.S. Pat. No. 5,024,289 discloses an insulation material for use in the gap between the inner and outer wall of a double wall exhaust pipe. For use in insulation of end cone regions of a catalytic converter intumescent materials have been proposed that are typically also used to mount the pollution control device in the metal housing of the catalytic converter. These intumescent mat materials have been used at a lower assembled density than when used in mounting the pollution control device, since they need only function as an insulation and not as a holding mat. Such intumescent sheet materials are described in, for example, U.S. Pat. Nos. 3,916,057 and 4,305,992. These insulation materials usually contain vermiculite as the intumescent material and an organic binder to hold the mat together. For example, WO 98/50688 discloses the use of such intumescent material as insulation material in an end cone region of a catalytic converter. However, in application, the large vermiculite particles can vibrate relative to the mat forming holes in the mat, reducing its insulation property and in a worst case eventually leading to the destruction of the mat. Particles or pieces of mat escaping from the cone area can lead to plugging of the monolith cells, which in turn can lead to extremely high backpressure and failure of the catalytic converter.

Amorphous, refractory, ceramic fiber mats were also tried as insulation material for end cone regions of catalytic converters, but these mats generally lacked sufficient resiliency to provide long term durability as an end cone insulation. In addition, they also suffer from destruction of the mat upon vibrations typically encountered in motor vehicles. U.S. Pat. No. 5,250,269 describes a method to significantly increase the resiliency of refractory ceramic fibers by annealing them at high temperature. But even then the vibration resistance is still not satisfactory. Moreover, the annealing step adds further manufacturing steps making manufacturing less convenient and adding costs.

Polycrystalline fibers have also been used for end-cone insulation. These fibers generally perform well as insulative material in exhaust system components but they are much more expensive than the materials referred to above making their use in exhaust system components generally unattractive.

It would now be desired to find alternative insulation material that can be used to insulate various components of an exhaust system including for example an exhaust pipe or end cone of a catalytic converter. In particular it would be desirable to find insulation material that can be used in a gap between the walls of a double wall of the exhaust system component whereby the insulation material is less prone to destruction through vibrations that may occur when the exhaust system is in use in the motor vehicle. It will generally also be preferred that such insulation material is more environmentally friendly and preferably the insulation material can be produced in a convenient way and at a low cost. Finally, it would also be desirable that the insulation material can be used both in high temperature conditions such as for example encountered with common gasoline engines as well as at lower temperature conditions as may for example be found with diesel engines and in particular turbo diesel engines.

3. SUMMARY OF THE INVENTION

In one aspect of the present invention, there is provided an exhaust system component for use in an exhaust system of a motor vehicle, the exhaust system component comprising a double wall surrounding a space through which exhaust gas may flow when said exhaust system component is in use in an exhaust system, said double wall being comprised of a first and second metal wall that define between them a gap, said gap comprising an insulation material made of chopped aluminium silicate glass fibers.

It was found that an insulation material made of chopped aluminium silicate glass fibers offers good insulating properties when used in the gap of a double wall of an exhaust system component. Further, such insulation material can be manufactured in an easy and convenient way and at a low cost. Also, the insulation material generally provides good resistance to vibrations occurring while in use in a motor vehicle. The insulation material can further be readily designed for use with high temperature exhaust such as from a gasoline engine as well as for low temperature exhaust such as for example from diesel engines, in particular turbo diesel engines.

In a further aspect of the invention there is provided an exhaust system comprising an exhaust component as defined above. Still further, the present invention provides an end cone preform comprising an insulation material made of chopped glass fibers.

As used herein, the term 'end cone preform' means a three dimensional conical shape having the shape and dimension suitable for insulating an end cone of a catalytic converter and whereby the three dimensional conical shape maintains its shape under the force of gravity after having been formed.

As used herein, the term 'glass fiber' means a fiber consisting of glass and whereby the term glass means an inorganic product of fusion that has cooled to a rigid condition without substantially crystallizing.

4. BRIEF DESCRIPTION OF THE DRAWINGS

The invention is further explained and illustrated using the following schematic drawings without however the intention to limit to these illustrated embodiments:

5. DETAILED DESCRIPTION

Figure 1:
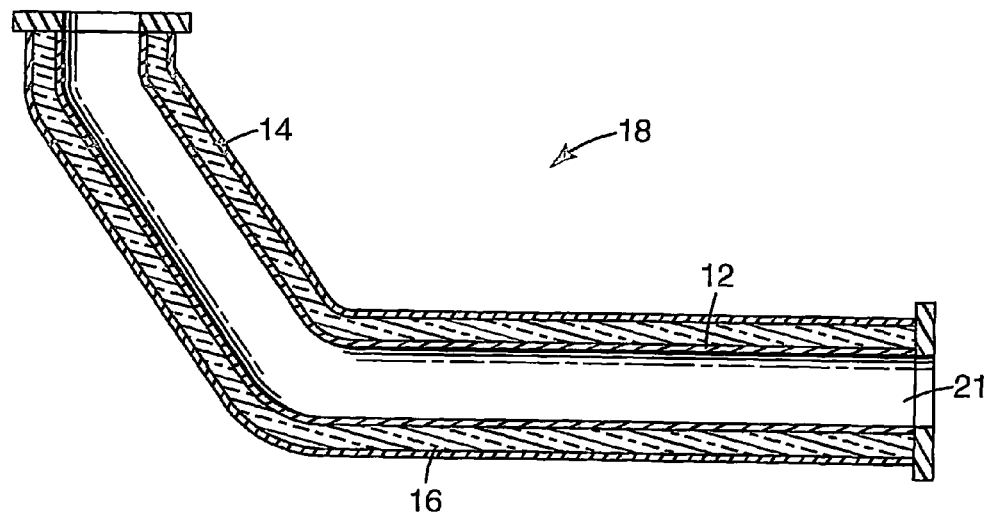
FIG. 1 shows a schematic drawing of a longitudinal cross-section of an exhaust pipe having a double wall containing insulation material.

The insulation material for use in the invention comprises chopped aluminium silicate glass fibers. The term chopped means that the fibers are individualized by cutting or chopping them. To provide individualized (i.e., separate each fiber from each other) fibers, a tow or yarn of fibers can be chopped, for example, using a glass roving cutter (commercially available, for example, under the trade designation "MODEL 90 GLASS ROVING CUTTER" from Finn & Fram, Inc., of Pacoma, Calif.), to the desired length (typically in the range from about 0.5 to about 15 cm). The fibers are typically reasonably uniform in diameter, i.e. the amount of fibers having a diameter within +/−3 µm of the average is generally at least 70% by weight, preferably at least 80% by weight and most preferably at least 90% by weight of the total weight of glass fibers. The resulting fibers are essentially shot free, i.e. containing less than 2% by weight, preferably less than 1% by weight and most preferably less than 0.5% by weight of shot based on the fiber weight. Without intending to be bound by any theory, it is believed that amongst other, the fact that the fibers can be produced essentially free of shot, improves the resistance of the insulation material to vibrations such that the insulation material better maintains its integrity and insulating properties over time. The glass fibers are typically magnesium aluminium silicate glass fibers, i.e. glass fibers that comprise the oxides of magnesium, aluminium and silicium. However, other glass compositions may be used as well.

Examples of magnesium aluminium silicate glass fibers include glass fibers that comprise between 10 and 30% by weight of aluminium oxide, between 52 and 70% by weight of silicium oxide and between 1 and 12% of magnesium oxide. The weight percentage of the aforementioned oxides are based on the theoretical amount of $Al_2O_3$, $SiO_2$ and $MgO$. It will further be understood that the magnesium aluminium silicate glass fiber may contain additional oxides. For example, additional oxides that may be present include sodium or potassium oxides, boron oxide and calcium oxide. Particular examples of magnesium aluminium silicate glass fibers include E-glass fibers which typically have a composition of about 55% of $SiO_2$, 11% of $Al_2O_3$, 6% of $B_2O_3$, 18% of CaO, 5% of MgO and 5% of other oxides; S and S-2 glass fibers which typically have a composition of about 65% of $SiO_2$, 25% of $Al_2O_3$ and 10% of MgO and R-glass fibers which typically have a composition of 60% of $SiO_2$, 25% of $Al_2O_3$, 9% of CaO and 6% of MgO. E-glass, S-glass and S-2 glass are available for example from Advanced Glassfiber Yarns LLC and R-glass is available from Saint-Gobain Vetrotex.

The insulation material may contain other fibers in addition to the aluminium silicate glass fibers but typically at least 90% by weight and preferably at least 95% by weight of the fibers making up the insulation material will be aluminium silicate glass fibers and preferably magnesium aluminium silicate glass fibers. Preferably, the fibers making up the insulation material will have a number average diameter of 5 µm or more and preferably have a length of between 0.5 and 15 cm. Preferably, the insulation material is substantially free of or free of fibers that have a diameter of 3 µm or less. Substantially free here means that the amount of such small diameter fibers is not more than 2% by weight, preferably not more than 1% by weight of the total weight of fibers in the insulation material. Insulation material having no or little amount of fibers having a diameter of 3 µm or less, offer the advantage that they provide a lower health risk in the event that fibers would dislodge from the insulation material during use and or manufacturing. The glass fibers of the insulation material should preferably be bonded together and the insulation material therefore typically is a mat, generally a nonwoven mat.

In a preferred method for making the insulation material into a nonwoven mat, the cut or chopped glass fibers can be separated by passing them through a conventional two zone Laroche Opener (e.g. commercially available from Laroche S.A., Cours la Ville, France). The glass fibers can also be separated by passing them through a hammer mill, preferably a blow discharge hammer mill (e.g., commercially available under the trade designation "BLOWER DISCHARGE MODEL 20 HAMMER MILL" from C.S. Bell Co. of Tiffin, Ohio). Although less efficient, the fibers can be individualized using a conventional blower such as that commercially available under the trade designation "DAYTON RADIAL BLOWER," Model 3C 539, 31.1 cm (12.25 inches), 3 horsepower from W. W. Grainger of Chicago, Ill. The chopped fibers normally need only be passed through the Laroche Opener once. When using the hammer mill, they generally must be passed though twice. If a blower is used alone, the fibers are typically passed through it at least twice. Preferably, at least 50 percent by weight of the fibers are individualized before they are formed into a nonwoven mat.

Although cut or chopped fibers greater than about 15 cm are also useful in preparing the nonwoven mat, they tend to be more difficult to process. Separation of the fibers tends to increase the loftiness (i.e., decrease the bulk density) of the fibers making up the nonwoven mat thereby lowering the density of the resulting mat.

To facilitate processing and separation of the chopped or cut fibers with minimal breakage an antistatic lubricant (e.g., such as that commercially available under the trade designation "NEUIROSTAT" from Simco Co. Inc., of Hatfield, N.J.) can be sprayed into the hammer mill while the fibers are being separated.

According to a method for making the nonwoven mat, chopped, individualized fibers (preferably, about 2.5 to about 5 cm in length) are fed into a conventional web-forming machine (commercially available, for example, under the trade designation "RANDO WEBBER" from Rando Machine Corp. of Macedon, N.Y.; or "DAN WEB" from ScanWeb Co. of Denmark), wherein the fibers are drawn onto a wire screen or mesh belt (e.g., a metal or nylon belt). If a "DAN WEB"-type web-forming machine is used, the fibers are preferably individualized using a hammer mill and then a blower. Fibers having a length greater than about 2.5 cm tend to become entangled during the web formation process. To facilitate ease of handling of the mat, the mat can be formed on or placed on a scrim. Depending upon the length of the fibers, the resulting mat typically has sufficient handleability to be transferred to a needle punch machine without the need for a support (e.g., a scrim).

The nonwoven mat can also be made using conventional wet-forming or textile carding. For wet forming processes, the fiber length is preferably about 0.5 to about 6 cm. For textile processes, the fiber length is preferably about 5 to about 10 cm.

In order to hold the glass fibers together in the mat, the nonwoven mat may be needle punched. A needle-punched nonwoven mat refers to a mat wherein there is physical entanglement of fibers provided by multiple full or partial (preferably, full) penetration of the mat, for example, by barbed needles. The nonwoven mat can be needle punched using a conventional needle punching apparatus (e.g., a needle puncher commercially available under the trade designation "DILO" from Dilo of Germany, with barbed needles (commercially available, for example, from Foster Needle Company, Inc., of Manitowoc, Wis.)) to provide a needle-punched, nonwoven mat. Needle punching, which provides entanglement of the fibers, typically involves compressing the mat and then punching and drawing barbed needles through the mat. The optimum number of needle punches per area of mat will vary depending on the particular application. Typically, the nonwoven mat is needle punched to provide about 5 to about 60 needle punches/cm$^2$. Preferably, the mat is needle punched to provide about 10 to about 20 needle punches/cm$^2$.

Preferably, the needle-punched, nonwoven mat has a weight per unit area value in the range from about 400 to about 2000 g/m$^2$, and in another aspect a thickness in the range from about 0.5 to about 3 centimeters. Typical bulk density under a 5 kPA load is in the range 0.08-0.25 g/cc.

The nonwoven mat can also be stitchbonded using conventional techniques (see e.g., U.S. Pat. No. 4,181,514 (Lefkowitz et al.), the disclosure of which is incorporated herein by reference for its teaching of stitchbonding nonwoven mats). Typically, the mat is stitchbonded with organic thread. A thin layer of an organic or inorganic sheet material can be placed on either or both sides of the mat during stitchbonding to prevent or minimize the threads from cutting through the mat. Where it is desired that the stitching thread not decompose in use, an inorganic thread, such as ceramic or metal (e.g., stainless steel) can be used. The spacing of the stitches is usually from 3 to 30 mm so that the fibers are uniformly compressed throughout the entire area of the mat.

The fibers may also be formed into a mat by bonding the fibers with binders. The binders may be inorganic, such as clays and colloidal silica or organic. Organic binders are preferred as they provide the requisite resiliency for handling the mat but burn off during operation. Organic binders can be used in amounts from about 1 to 20% by weight on a dry basis. Suitable organic binder materials include aqueous polymer emulsions, solvent-based polymers, and 100% solids polymers. Aqueous polymer emulsions are organic binders polymers and elastomers in the latex form (e.g. natural rubber latices, styrene-butadiene latices, butadiene-acrylonitrile latices, and latices of acrylate and methacrylate polymers and copolymers). Solvent-based polymeric binders can be a polymer such as an acrylic, a polyurethane, or a rubber-based organic polymer. The 100% solids polymers include natural rubber, styrene-butadiene rubber, and other elastomers.

Preferably, the organic binder material includes an aqueous acrylic emulsion. Acrylic emulsions are preferred because of their aging properties and noncorrosive combustion products. Useful acrylic emulsions include those commercially available under the trade designations "RHOPLEX TR-934" (a 44.5% by weight solids aqueous emulsion of acrylic copolymers) and "RHOPLEX HA-8" (a 45.5% by weight solids aqueous emulsion of acrylic emulsion) from Rohm and Haas of Philadelphia, Pa., under the trade designation "NEOCRYL XA-2022" (a 60.5% solids aqueous dispersion of acrylic resin) from ICI Resins US of Wilmington, Mass., and under the trade name Airflex™ 600BP DEV (55% by weight solids aqueous emulsion of ethylene vinyl acetate acrylate polymer) from Air Products and Chemicals, Inc., Allentown, Pa. Organic binder materials can also include one or more plasticizers. Plasticizers tend to soften a polymer matrix and can contribute to the flexibility and moldability of the sheet materials made from the composition.

The mat with binder can be prepared by conventional papermaking process. In the papermaking process, chopped glass fibers are mixed with water and binder to form a mixture or slurry that is less than 10% solids. The slurry is then flocculated with a flocculating agent and drainage retention aid chemicals. Then, the flocculated mixture is placed onto a papermaking machine to be formed into a mat, dewatered, and dried. The mats may also be formed by impregnating the mat with binder, squeezing out the excess binder and curing. The binder may also be applied to the surface of the mat by spraying.

In accordance with a particular embodiment of the present invention, the mat may be comprised of a plurality of layers of the glass fibers. Such layers may be distinguished from each other in the average diameter of the fibers used, the length of the fibers used and/or the chemical composition of the fibers used. Since the heat resistance and mechanical strength of fibers at temperature vary with their composition and to a lesser degree fiber diameter, fiber layers can be selected to optimize performance while minimizing cost. For example, a nonwoven mat consisting of a layer of S-2 glass combined with a layer of E-glass can be used as insulation material in an exhaust system component. In use the S-2 glass layer is placed directly against the hotter, inner wall of the double wall of the exhaust system component while the E-glass layer is against the cooler, outer wall of the double wall of the exhaust system component. The layered combination mat can withstand considerably higher temperatures than a mat consisting of only E-glass fibers at greatly reduced cost compared to a mat consisting of only S-2 glass fibers. The layered mats can be made by first forming the individual non-woven layers having a specific type of fiber using the forming techniques described earlier. These layers may then be needle bonded together to form the finished mat having the desired discrete layers.

The insulation material can be used in a variety of exhaust system components where an insulation material is desired in a gap defined between a first (e.g. outer) wall and a second (e.g. inner) wall of a double wall that surrounds an interior space of the exhaust system component in which, when in use, hot exhaust gas may flow. The insulation material is typically mounted in the gap at a mount density between 0.1 and 0.45 g/cm$^3$, preferably between 0.2 and 0.3 g/cm$^3$. Although the insulating properties increase at a lower mount density, a too low density of the insulation material may cause the fibers to loosen when the exhaust system component is subjected to vibrations.

The insulation material is particularly useful in insulating the double wall of an exhaust pipe or in insulating the double wall of a pollution control device such as a catalytic converter in a transition zone defined between the inlet or outlet of the converter and the pollution control monolith of the pollution control device. Since this transition zone typically is conical in shape, it is also referred to as end cone in connection with this invention.

Referring now to FIG. 1, there is shown one embodiment of an exhaust system component in connection with the invention, schematically showing a longitudinal cross section of an exhaust pipe 18. Exhaust pipe 18 comprises a double wall consisting of a first and outer metal wall 14 and a second and inner metal wall 12. Between them, outer wall 14 and inner wall 12 define a gap which contains the insulation material 16 made of chopped glass fibers as set out in detail above. The double wall of the exhaust pipe surrounds an interior space 21 through which the exhaust gas flows when the exhaust pipe is in use in an exhaust system of a motor vehicle.

Figure 2:
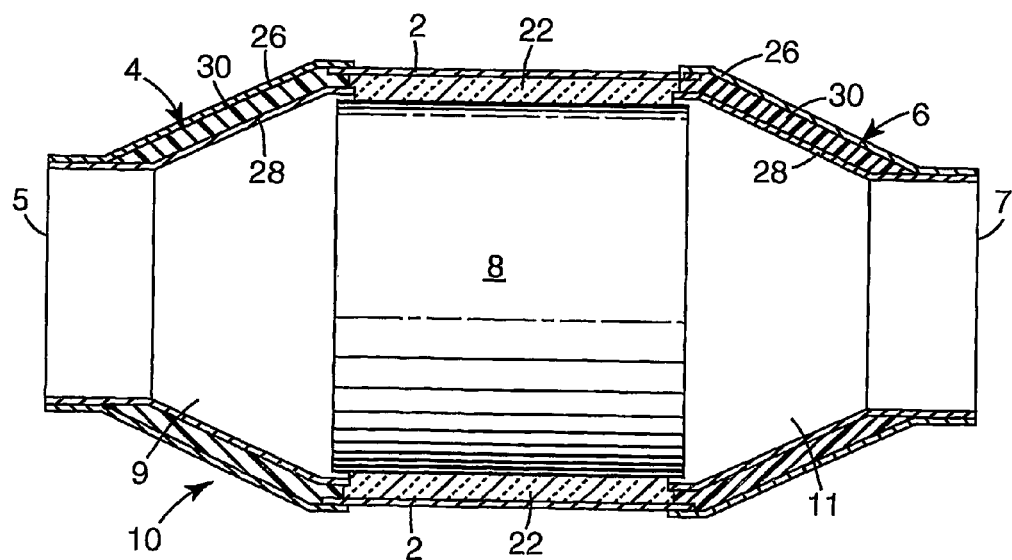
FIG. 2 shows a schematic drawing of a longitudinal cross-section of a pollution control device having an inlet and an outlet cone.

FIG. 2 shows an embodiment where the exhaust system component comprises a pollution control device 10, e.g. a catalytic converter. Pollution control device 10 comprises a housing 2 with generally conical transition zone 4 (inlet cone) defined between inlet 5 and pollution control monolith 8 and a generally conical transition zone 6 (outlet cone) defined between outlet 7 and pollution control monolith 8. The housing 2, which is also referred to as a can or casing, can be made of any suitable material known for this purpose in the art and is typically of metal, preferably stainless steel. Disposed within the housing 2 is a pollution control monolith 8 such as a monolithic catalytic element formed of a honeycombed monolithic body either of ceramic or metal. Surrounding pollution control monolith 8 is a mounting mat 22 which is generally made of intumescent material. Mounting mat 22 should maintain a sufficient holding power of the pollution control monolith 8 when the gap between the casing and the pollution control monolith widens when hot exhaust gas flows through the pollution control device.

The inlet cone 4 and outlet cone 6 comprise a double wall composed of a metal inner wall 28 and an outer metal wall 26 defining between them a gap in which is present the insulation material 30 having a composition as described above. The metal walls 26 and 28 of the inlet and outlet cones are typically made of stainless steel or a commercially available alloy such as INCONEL™ 600. Conversely to the gap between the pollution control monolith 8 and the casing 2, the gap defined between the inner and outer wall of the inlet and outlet cones tends to narrow when hot gas flows through the interior spaces 9 and 11 surrounded by the double wall of the inlet and outlet cones. The gap tends to narrow because the inner wall 28 will become hotter and therefore expand more than the cooler outer metal wall 26. Accordingly, the insulation material 30 should have a sufficient resilience such that it continues to properly fill and insulate the gap after repeated cycles of heating and cooling. The non-intumrscent insulation material used in connection with the present invention has a good resilience as opposed to the intumescent material that is typically used for the mounting mat 22.

For use in the double wall of an end cone of a pollution control device, the insulation material is preferably formed into an end cone preform. Such an end cone preform of the insulation material can be obtained according to any of the methods disclosed in WO 98/50688. A first such method includes making a plurality of slits in an insulating nonwoven mat material enabling the insulation material to be formed into a cone and then providing a shape retaining material in intimate contact with the insulation material so as to enable the insulation material to maintain the cone shape. The shape retaining element may be for example a rigidizing solution, a metal foil laminated to one surface of the insulation material or a heat shrinkable film. A further method includes cutting a sheet of insulating mat material into a half moon and then attaching both ends of the sheet together with a shape retaining element such as for example an adhesive tape.

In addition to the methods disclosed in WO 98/50688 the following method can be used. This method includes preparing an aqueous slurry of the chopped glass fibers and optionally suitable organic or inorganic binders, processing the slurry to prepare a molded preform, and removing water to produce the insulation material molded into an end cone preform. The slurry compositions of the present invention typically contain glass fibers having an average length less than 3 cm. The average length is typically greater than about 0.3 cm.

In addition to glass fibers, the slurries of the invention can include an inorganic colloidal material formed in the presence of the glass fibers. The inorganic colloid material can be formed, for example, by adding to the slurry two or more water soluble precursors that combine to form, for example, a metal hydroxide. Forming the inorganic colloidal material in the slurry tends to minimize agglomeration of the colloid and enhance uniformity of the colloid distribution throughout the slurry.

An example of an inorganic colloidal metal hydroxide is aluminum hydroxide formed by the reaction of an alkalai metal aluminate and an aluminum salt. More specifically, aluminum hydroxide can form, for example, from the reaction of sodium aluminate with aluminum sulfate, aluminum phosphate, aluminum chloride, aluminum nitrate, or a mixture thereof. The inorganic colloidal material is usually present in the slurry in an amount less than about 30% based on the weight of the glass fibers.

The inorganic colloidal material can function as an inorganic binder to help hold together the glass fibers. An inorganic binder can be advantageous over an organic binder during processing of the slurry to form a molded preform. Some organic binders can form a film leading to blockage of the screen that may be part of the water removal system. For example, some molds have screens.

The slurry typically contains up to about 30 weight percent solids based on the weight of the slurry. For example, the slurry can contain up to about 20 weight percent or up to about 10 weight percent solids based on the weight of the slurry. The slurry typically contains at least about 1 percent solids based on the weight of the slurry. For example, the slurry can contain at least about 2 weight percent or at least 3 weight percent solids. In some embodiments, the slurry can contain about 1 to about 10, about 2 to about 8, or about 3 to about 6 weight percent solids. Higher solids can be advantageous because less water needs to be removed to form the insulation material. However, slurries with higher percent solids tend to be more difficult to mix.

The water used in the slurry can be well water or water that has been treated to remove impurities such as salts and organic compounds. In some embodiments, the water is deionized water, distilled water, or a combination thereof. Organic binders can be included in the slurry composition in addition to the inorganic colloidal material. Organic binders tend to improve the flexibility and the handling characteristics of molded three-dimensional insulation material. Insulation material that is more flexible may be easier to position between the inner and outer housing in the end cone region of a pollution control device. Organic binders can be used in amounts up to about 20 weight percent based on the weight of the insulation material. In some embodiments, the organic binder is present in amounts up to about 10 weight percent, up to about 5 weight percent or up to about 3 weight percent based on the weight of the insulation material.

Suitable organic binder materials can include aqueous polymer emulsions, solvent-based polymers, and solvent free polymers. The aqueous polymer emulsions can include organic binder polymers and elastomers in the form of a latex (e.g., natural rubber lattices, styrene-butadiene lattices, butadiene-acrylonitrile lattices, and lattices of acrylate and methacrylate polymers and copolymers). The solvent-based polymeric binder can include a polymer such as an acrylic, a polyurethane, a vinyl acetate, a cellulose, or a rubber based organic polymer. The solvent free polymers can include natural rubber, styrene-butadiene rubber, and other elastomers.

In some embodiments, the organic binder material includes an aqueous acrylic emulsion. Acrylic emulsions advantageously tend to have good aging properties and non-corrosive combustion products. Suitable acrylic emulsions can include, but are not limited to, commercially available products such as those sold under the trade name RHOPLEX TR-934 (an aqueous acrylic emulsion having 44.5 weight percent solids) and RHOPLEX HA-8 (an aqueous emulsion of acrylic copolymers having 45.5 weight percent solids) from Rohm and Hass (Philadelphia, Pa.); under the trade name NEOCRYL XA-2022 (an aqueous dispersion of an acrylic resins having 60.5 percent solids) available form ICI Resins US (Wilmington, Mass.); and under the trade name AIRFLEX 600BP DEV (an aqueous emulsion of ethylene vinyl acrylate terpolymer having 55 weight percent solids) from Air Products and Chemical, Inc. (Allentown, Pa.).

Organic binders can also include one or more plasticizers. Plasticizers tend to soften a polymer matrix and can enhance the flexibility and moldability of the insulation material.

Other additives can also be included in the aqueous slurry composition. Such additives can include defoamers, flocculants, surfactants, and the like. Strength enhancing agents can also be included such as, for example, organic fibers and glass fibers. Suitable organic fibers include rayon and cellulose fibers.

One or more of the exhaust system components can be used and combined in an exhaust system of a motor vehicle. For example, the exhaust system component(s) can be used in the exhaust system of motor vehicles for use on a road such as a car, a van, a truck or a bus. The exhaust system can be used in motor vehicles that use a gasoline engine as well as a diesel engine.

The invention will now be described by way of reference to the following examples without the intention to limit the invention thereto.

EXAMPLES

Materials Used in the Examples

S-2 Glass fibers, diameter about 9 μm, chopped to a length of 1.0 inches (25.4 mm), obtainable as 401 S-2 Glass Chopped Strands from Advanced Glassfiber Yarns LLC (AGY), Aiken, South Carolina/USA.

E Chopped glass strands, diameter 9 μm, chopped to a length of 1 inch (25.4 mm) from Advanced Glassfiber Yarns LLC (AGY), Aiken, South Carolina/USA.

R Glass fibers (typical composition 60% $SiO_2$, 25% $Al_2O_3$, 9% CaO, and 6% MgO) having a diameter of ca. 10 μm, chopped to a length of 36 mm, available from Saint-Gobain Vetrotex Deutschland GmbH, Herzogenrath/Germany.

Test Methods

A. Hot Vibration Test

The hot vibration test is used to evaluate the suitability of the mats of the present invention for use in end cone assemblies.

The test insulation material is assembled into a special double-walled end cone and welded on the inlet side. The outlet side of the double-walled end cone is left open, so that material is free to escape if the holding pressure of the insulation mat becomes too low. A deflector plate is welded to the bottom of the inner cone, so as to deflect the exhaust gas against the surface of the double-walled end cone.

The end cone assembly is then mounted on conventional shaker table designed to accelerate loads of up to 4,000 pounds (1818 kg) (commercially available from Unholtz-Dickie Corp. of Wallingford, Conn./USA) employed to provide vibration to the test assembly. The inlet axis was in a vertical relationship (i.e. perpendicular) to the top of the shaker table. The end cone assembly is connected to a natural gas burner heat source.

The end cone assembly is preconditioned by heating the assembly to 1075° C. inlet gas temperature for one hour. This assures that any organic materials are burned off prior to start of the actual test. The assembly is then taken off the shaker table and weighed after cooling.

The cone assembly is then remounted on the shaker table and vibration and temperature cycles are carried out. During the shaking segment of the test, "sine on random" type vibration was employed to generate further stress and simulate accelerated ageing of the test assembly under use conditions. The inlet gas temperature is cycled between 23° C. (using compressed air) and 1075° C. every 15 minutes along with vibration (sine on random type) steps, each having a duration of one hour, in the following sequence:

| Step #1 | Sine on random vibration with peaks to 53.2 g's, |
|---------|---------------------------------------------------|
| Step #2 | Sine on random vibration with peaks to 58.7 g's, |
| Step #3 | Sine on random vibration with peaks to 66.5 g's, |
| Step #4 | Sine on random vibration with peaks to 77.5 g's, and |
| Step #5 | Sine on random vibration with peaks to 93.0 g's, | where 'g' represents the force of gravity.

After the vibration and thermal cycling is complete, the end cone assembly is tipped upside down and shaken to remove any loose material. The end cone is again weighed, and weight compared to weight after preconditioning. In this way, the weight loss of the insulation material as a result of the shake testing can be determined. The end cone material can also be visually inspected.

B. Real Condition Fixture Test (RCFT)

This test models actual conditions found in a pollution control device with a monolith or diesel particulate trap during typical use, and measures the pressure exerted by the mounting material under those modelled use conditions, The RCFT method is described in detail in *Material Aspects in Automotive Pollution Control Devices*, ed. Hans Bode, Wiley-VCH, 2002, pp. 206-208. In this case, the RCFT device was used to determine pressure exerted by insulation mats while simulating condition found in a double wall end cone.

Two 50.8 mm by 50.8 mm heated stainless steel platens, controlled independently, were heated to different temperatures to simulate the metal inner cone and metal outer cone temperatures, respectively. Simultaneously, the space or gap between platens was decreased by a value calculated from the temperature and the thermal expansion coefficients of the inner and outer cones of a catalytic converter. For a catalytic converter in normal use, this would mean an inner cone temperature of about 700° C. and an outer cone temperature of about 400° C.

Three cycles of the RCFT were performed on each mat sample.

Example 1

R-glass fibers (60% $SiO_2$, 25% $Al_2O_3$, 9% CaO, and 6% MgO) having a diameter of ca. 10 μm, chopped to a length of 36 mm, obtained from Saint-Gobain Vetrotex, were processed into a web by the following method. The glass fibers were opened in a two-zone Laroche opener. The first zone had a feed speed of 2 m/min and a Lickerin roll speed of 2,500 rev/min. The second zone had a feed speed of 4 m/min and a Lickerin roll speed of 2,500 rev/min. The output speed was 6.5 rn/min.

The opened fibers were then fed into a conventional web-forming machine (commercially available under the trade designation "Rando Webber" from Rando Machine Corp. of Macedon, N.Y., wherein the fibers were blown onto a porous metal roll to form a continuous web. The continuous web was then needle-bonded on a conventional needle tacker. The needle speed was 100 cycles/min and the output speed was 1.1 m/min. The "weight per area" of the mat could be adjusted as desired.

The mat of Example 1 was subjected to a Hot Vibration Test and a Real Condition Fixture Test (RCFT) as described above under Test Methods. The mat of Example 1 showed a weight loss of only 4.14 g in the Hot Vibration Test. Hot Vibration Test data is summarized in Table 2.

RCFT data for Example 1 is summarized in Table 3. The mat of Example 1 retained a pressure of at least 5 kPa during the three temperature cycles, indicating that sufficient pressure was present to reliably hold the material within the end cone.

Example 2

A mat comprising only S-2 glass fibers was prepared by the same method as employed in Example 1. This mat was subjected to RCFT. Results are summarized in Table 3. The mat retained a pressure of at least 17 kPa during the three temperature cycles indicating that sufficient pressure was present to hold the material within the end cone.

Example 3

A two-layer mat was prepared by laminating two separately prepared layers together. The first layer comprised R-glass. The second layer comprised E-glass. Each of the layers was prepared by the method described in Example 1. The two layers were put together by needle-bonding. The mounting mat formed in this manner had two discrete layers of glass of differing compositions. The composition of the two-layer mat of Example 3 is summarized in Table 1.

The two layer mat of Example 3 was subjected to the RCFT with the S-glass layer positioned towards the hotter of the two platens in the RCFT. The mat retained a pressure of at least 5 kPa during the three temperature cycles indicating that sufficient pressure was present to hold the material within the end cone.

Comparative Example 1

Comparative Example 1 (C1) comprised a commercially available intumescent pollution control device mounting mat. It comprises about 55% unexpanded vermiculite, about 37% fiber, and about 8% organic binder. The fibers are melt-formed, amorphous, shot-containing alumina/silica fibers having a diameter of about 2-3 microns having a length of not more than 0.5 inch (1.27 cm). The nominal weight per area of the mat of C1 was 4070 g/m$^2$.

Comparative Example 1 showed extensive weight loss during the Hot Vibration Test as summarized in Table 2.

Comparative Example 2

Comparative Example 2 (C2) comprised a commercially available intumescent pollution control device mounting mat It comprises about 55% unexpanded vermiculite, about 37% fiber, and about 8% organic binder. The fibers are melt-formed, amorphous, shot-containing alumina/silica fibers having a diameter of about 2-3 microns having a length of not more than 0.5 inch (1.27 cm). The nominal weight per area of the mat of C2 was 3100 g/m$^2$.

Comparative Example 2 also showed extensive weight loss during the Hot Vibration Test as summarized in Table 2.

Comparative Example 2 was also subjected to the Real Condition Fixture Test (RCFI). Although the pressure generated at the peak temperature (700° C./400° C.) of the cycle was extremely high, residual pressure after three cycles was only 1 kPa, a pressure insufficient for reliable holding.

Comparative Example 3

Comparative Example 3 (C3) comprised a reduced vermiculite intumescent pollution control device mounting mat that is commercially available. It comprised about 37% unexpanded vermiculite, about 54% fiber, and about 9% organic binder. The fibers were the same as those of Comparative Examples 1 and 2.

Comparative Example 3 showed extensive weight loss during the Hot Vibration Test as summarized in Table 2.

Comparative Example 4

Comparative Example 4 (C4) comprised a commercially available non-intumescent pollution control device mounting mat made of high alumina polycrystalline ceramic fibers. The fibers are essentially shot-free and have an average diameter of 5 microns.

Comparative Example 4 showed little weight loss during the Hot Vibration Test as summarized in Table 2.

Comparative Example 5

Comparative Example 5 (C5) comprised a binder-free, non-woven fiber mat made of Belcotex™ silica glass fibers having a fiber diameter of 9 microns, obtained from Belchem Fiber Materials GmbH, Brand-Erbisdorf, Germany.

Comparative Example 5 was subjected to the Real Condition Fixture Test (RCFT). Residual pressure after three cycles was only 1 kPa, a pressure insufficient to reliably hold the mat in place. RCFT results are summarized in Table 3.

Comparative Example 6

Comparative Example 6 (C6) comprised a wet laid mat prepared from melt-formed, amorphous, shot containing alumina silicate ceramic fibers available as Kaowool™ Bulk Fibers from Thermal Ceramics in Augusta, Georgia. The fibers have a diameter of 2-3 microns and a length of about 0.5 inch (1.27 cm).

Comparative Example 6 was subjected to the Real Condition Fixture Test (RCFT). Residual pressure after three cycles was only 1 kPa, a pressure insufficient for reliable holding. RCFT results are summarized in Table 3.

TABLE 1

| Example | Mat type | Intumescent | Nominal weight per area, g/m$^2$ |
|---|---|---|---|
| 1 | R | − | 900 |
| 2 | S-2 | − | 800 |
| 3 | E/S-2 bilayer | − | 1200 |
| C1 | Intumescent mat 1 | + | 4070 |
| C2 | Intumescent mat 2 | + | 3100 |
| C3 | Intumescent mat 3 | + | 3600 |
| C4 | Polycrystalline fiber mat | − | 880 |
| C5 | Belcotex™ mat | − | 400 |
| C6 | Kaowool™ mat | − | 1200 |

TABLE 2

| Example | Mat Type | Nominal mount density* (g/cm$^3$) | Hot shake (Total wt. loss in g) |
|---|---|---|---|
| 1 | R-glass fiber mat | 0.18 | 4.17 |
| C1 | Intumescent mat 1 | 0.81 | 51.07 |
| C2 | Intumescent mat 2 | 0.62 | 36.81 |
| C3 | Intumescent mat 3 | 0.72 | 34.69 |
| C4 | Polycrystalline fiber mat | 0.18 | 0.60 |

*selected so as to obtain approximately the same initial holding force for each sample

TABLE 3

| Example | Mat type | Mount density, (g/cm$^3$) | Initial pressure, 23° C. (kPa) | Pressure at peak temp. (700/400)* for cycle 1 (kPa) | Pressure at peak temp. (700/400)* for cycle 3 (kPa) | Final pressure, 23° C. (kPa) |
|---|---|---|---|---|---|---|
| 1 | R glass fiber mat | 0.27 | 80 | 34 | 36 | 5 |
| 2 | S glass fiber mat | 0.27 | 129 | 83 | 87 | 17 |
| 3 | E/S-2 bilayer mat | 0.27 | 91 | 35 | 36 | 5 |
| C2 | Intumescent mat 2 | 0.74 | 30 | 543 | 343 | 1 |
| C5 | Belcotex™ mat | 0.27 | 106 | 4 | 3 | 1 |
| C6 | Kaowool™ mat | 0.27 | 9 | 8 | 9 | 1 |

*700° C./400° C., peak temperatures of the internal and external walls of the end cone assembly, respectively, during the test

The invention claimed is:

1. A Method of making a molded preform for use in an exhaust system component of an exhaust system of an internal combustion engine, the exhaust system component comprising two opposing metal walls defining a gap therebetween, with the molded preform being disposed in the gap, and a space through which exhaust gas may flow when the exhaust system component is used in an exhaust system of an internal combustion engine, said method comprising:
    mixing water, a binder and chopped magnesium aluminium silicate glass fibers to form a slurry of non-intumescent insulation material;
    providing a mold constructed to form a molded preform comprising the insulation material and being dimensioned so as to be positionable within the gap between the two opposing walls of the exhaust system component, with the mold having a screen through which water from the slurry is removed; and
    processing the slurry to form the molded preform, said processing comprising disposing the slurry into the mold and removing the water from the slurry through the screen so as to form the molded perform, wherein the removal of the water through the screen forms the molded preform into either (a) a tubular shape suitable for use in a double-walled exhaust pipe of an exhaust system or (b) an end cone preform having a three dimensional conical shape with dimensions suitable for being inserted into and insulating an end cone region of a pollution control device, and the end cone preform maintains its three dimensional conical shape under the force of gravity after having been molded.

2. The method according to claim 1, further comprising: chopping magnesium aluminium silicate glass fibers, for use in the slurry, to an average length in the range of from greater than about 0.3 cm to less than 3 cm.

3. The method according to claim 2, wherein the magnesium aluminium silicate glass fibers have a number average diameter of 5 µm or more and a length in the range of from about 0.5 cm to about 15 cm.

4. The method according to claim 3, wherein the insulation material is comprised of at least 90% by weight of the magnesium aluminium silicate glass fibers.

5. The method according to claim 3, wherein the slurry comprises organic binder material in an amount up to about 10 weight percent based on the weight of the insulation material.

6. The method according to claim 5, wherein the slurry comprises inorganic binder material.

7. The method according to claim 5, wherein the slurry further comprises an inorganic colloidal material, and said method further comprises:
forming the inorganic colloidal material in the slurry in the presence of the magnesium aluminium silicate glass fibers.

8. The method according to claim 7, wherein the inorganic colloidal material is formed by adding two or more water soluble precursors to the slurry that combine to form a metal hydroxide.

9. The method according to claim 3, wherein the slurry comprises organic binder material and one or more plasticizers.

10. A molded preform made by the method according to claim 1.

11. A method of making an exhaust system component, said method comprising:
making a molded preform according to the method of claim 1;
providing a first metal wall and a second metal wall;
positioning the first and second metal walls so as to define between them a gap; and
positioning the molded preform in the gap between the first and second metal walls.

12. The method according to claim 11, wherein the first metal wall is an inner housing and the second metal wall is an outer housing, and the inner and outer housings form an end cone region of a pollution control device.

13. The method according to claim 11, wherein the first metal wall is an inner housing and the second metal wall is an outer housing, and the inner and outer housings form a double walled exhaust pipe.

14. An exhaust system component made by a method according to claim 11.

15. An exhaust system for use in a motor vehicle, said exhaust system comprising an exhaust system component according to claim 14.

16. A Method of making a molded end cone preform dimensioned for use in an end cone region of a pollution control device, the pollution control device comprising a cone shaped inner housing and a cone shaped outer housing defining a gap therebetween, with the molded end cone preform being disposed in the gap, said method comprising:
mixing water, a binder and chopped magnesium aluminium silicate glass fibers to form a slurry of non-intumescent insulation material;
providing a mold constructed to form a molded preform comprising the non-intumescent insulation material and being dimensioned so as to be positionable within the gap between the inner and outer cone shaped housings of the pollution control device, with the mold having a screen through which water from the slurry is removed; and
disposing the slurry into the mold and removing the water from the slurry through the screen so as to form the molded end cone preform,
wherein the slurry comprises organic binder material in an amount up to about 10 weight percent based on the weight of the non-intumescent insulation material.

17. The method according to claim 16, wherein the slurry further comprises an inorganic colloidal material, and said method further comprises:
forming the inorganic colloidal material in the slurry in the presence of the magnesium aluminium silicate glass fibers.

* * * * *

UNITED STATES PATENT AND TRADEMARK OFFICE
CERTIFICATE OF CORRECTION

| | | |
|---|---|---|
| PATENT NO. | : 8,186,058 B2 | Page 1 of 1 |
| APPLICATION NO. | : 10/551257 | |
| DATED | : May 29, 2012 | |
| INVENTOR(S) | : Richard Paul Merry | |

It is certified that error appears in the above-identified patent and that said Letters Patent is hereby corrected as shown below:

Column 3
Line 65, delete "Pacoma," and insert -- Pacoima, --.

Column 5
Line 20, delete ""NEUIROSTAT"" and insert -- "NEUROSTAT" --.

Column 8
Line 17, delete "non-intumrscent" and insert -- non-intumescent --.

Column 9
Line 57, delete "form" and insert -- from --.

Column 11
Line 51, delete "rn/min." and insert -- m/min. --.

Column 12
Line 48, delete "mat" and insert -- mat. --.
Line 58, delete "(RCFI)." and insert -- (RCFT). --.

Column 13
Line 64, delete "$g/m^{2\ 2}$" and insert -- $g/m^2$ --.

Signed and Sealed this
Eleventh Day of September, 2012

David J. Kappos
*Director of the United States Patent and Trademark Office*